(12) United States Patent
Davis et al.

(10) Patent No.: US 7,644,233 B2
(45) Date of Patent: Jan. 5, 2010

(54) APPARATUS AND METHOD FOR SUPPORTING SIMULTANEOUS STORAGE OF TRACE AND STANDARD CACHE LINES

(75) Inventors: Gordon T. Davis, Chapel Hill, NC (US); Richard W. Doing, Raleigh, NC (US); John D. Jabusch, Cary, NC (US); M V V Anil Krishna, Cary, NC (US); Brett Olsson, Cry, NC (US); Eric F. Robinson, Raleigh, NC (US); Sumedh W. Sathaye, Cary, NC (US); Jeffrey R. Summers, Raleign, NC (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 11/538,445

(22) Filed: Oct. 4, 2006

(65) Prior Publication Data
US 2008/0086596 A1     Apr. 10, 2008

(51) Int. Cl.
G06F 12/00     (2006.01)
(52) U.S. Cl. .................. 711/118; 711/119; 711/120; 711/125; 711/E12.001
(58) Field of Classification Search .......... 711/118, 711/125, E12.001, 119, 120
See application file for complete search history.

(56) References Cited

U.S. PATENT DOCUMENTS

| | | | |
|---|---|---|---|
| 6,014,742 A | 1/2000 | Krick | |
| 6,018,786 A | 1/2000 | Krick | |
| 6,073,213 A | 6/2000 | Peled | |
| 6,076,144 A | 6/2000 | Peled | |
| 6,105,032 A | 8/2000 | Bunda | |
| 6,145,123 A | 11/2000 | Torrey | |
| 6,167,536 A | 12/2000 | Mann | |
| 6,170,038 B1 | 1/2001 | Krick | |
| 6,185,675 B1 | 2/2001 | Kranich | |
| 6,185,732 B1 | 2/2001 | Mann | |
| 6,223,228 B1 | 4/2001 | Ryan | |
| 6,223,338 B1 | 4/2001 | Smolders | |
| 6,223,339 B1 | 4/2001 | Shah | |
| 6,256,727 B1 | 7/2001 | McDonald | |
| 6,327,699 B1 | 12/2001 | Larus | |
| 6,332,189 B1 | 12/2001 | Baweja | |
| 6,339,822 B1 | 1/2002 | Miller | |
| 6,418,530 B2 | 7/2002 | Hsu | |
| 6,442,674 B1 | 8/2002 | Lee | |
| 6,449,714 B1 | 9/2002 | Sinharoy | |
| 6,453,411 B1 | 9/2002 | Hsu | |
| 6,457,119 B1 | 9/2002 | Boggs | |
| 6,549,987 B1 | 4/2003 | Rappoport | |
| 6,578,138 B1 | 6/2003 | Kyker | |

(Continued)

*Primary Examiner*—Christian P Chace
*Assistant Examiner*—Mehdi Namazi
(74) *Attorney, Agent, or Firm*—Joscelyn G. Cockburn; Mark E. McBurney; Daniel E. McConnel

(57) ABSTRACT

A single unified level one instruction cache in which some lines may contain traces and other lines in the same congruence class may contain blocks of instructions consistent with conventional cache lines. A mechanism is described for indexing into the cache, and selecting the desired line. Control is exercised over which lines are contained within the cache. Provision is made for selection between a trace line and a conventional line when both match during a tag compare step.

6 Claims, 3 Drawing Sheets

U.S. PATENT DOCUMENTS

| | | |
|---|---|---|
| 6,598,122 B2 | 7/2003 | Mukherjee |
| 6,631,445 B2 | 10/2003 | Rappoport |
| 6,647,491 B2 | 11/2003 | Hsu |
| 6,792,525 B2 | 9/2004 | Mukherjee |
| 6,807,522 B1 | 10/2004 | Orfali |
| 6,823,473 B2 | 11/2004 | Mukherjee |
| 6,854,051 B2 | 2/2005 | Mukherjee |
| 6,854,075 B2 | 2/2005 | Mukherjee |
| 6,877,089 B2 | 4/2005 | Sinharoy |
| 6,950,903 B2 | 9/2005 | Solomon |
| 6,950,924 B2 | 9/2005 | Miller |
| 6,964,043 B2 | 11/2005 | Wu |
| 2002/0087831 A1* | 7/2002 | Samra et al. ............. 712/205 |
| 2006/0224928 A1* | 10/2006 | Cardinell et al. ............ 714/45 |
| 2008/0229077 A1* | 9/2008 | Sathaye ................. 712/216 |

\* cited by examiner

APPARATUS AND METHOD FOR SUPPORTING SIMULTANEOUS STORAGE OF TRACE AND STANDARD CACHE LINES

FIELD AND BACKGROUND OF INVENTION

Traditional processor designs make use of various cache structures to store local copies of instructions and data in order to avoid lengthy access times of typical DRAM memory. In a typical cache hierarchy, caches closer to the processor (L1) tend to be smaller and very fast, while caches closer to the DRAM (L2 or L3) tend to be significantly larger but also slower (longer access time). The larger caches tend to handle both instructions and data, while quite often a processor system will include separate data cache and instruction cache at the L1 level (i.e. closest to the processor core). As is understood by those familiar with cache organization and operation, the processor core will issue requests which are handled, if possible, in the closest cache within which responsive data is found (a "cache hit"), with requests being "handed down" from one layer to the next as there may be cache misses.

All of these caches typically have similar organization, with the main difference being in specific dimensions (e.g. cache line size, number of ways per congruence class, number of congruence classes). In the case of an L1 Instruction cache, the cache is accessed either when code execution reaches the end of the previously fetched cache line or when a taken (or at least predicted taken) branch is encountered within the previously fetched cache line. In either case, a next instruction address is presented to the cache. In typical operation, a congruence class is selected via an abbreviated address (ignoring high-order bits), and a specific way within the congruence class is selected by matching the address to the contents of an address field within the tag of each way within the congruence class. Addresses used for indexing and for matching tags can use either effective or real addresses depending on system issues beyond the scope of this disclosure. Typically, low order address bits (e.g. selecting specific byte or word within a cache line) are ignored for both indexing into the tag array and for comparing tag contents. This is because for conventional caches, all such bytes/words will be stored in the same cache line.

Recently, Instruction Caches that store traces of instruction execution have been used, most notably with the Intel Pentium 4. These "Trace Caches" typically combine blocks of instructions from different address regions (i.e. that would have required multiple conventional cache lines). The objective of a trace cache is to handle branching more efficiently, at least when the branching is well predicted. The instruction at a branch target address is simply the next instruction in the trace line, allowing the processor to execute code with high branch density just as efficiently as it executes long blocks of code without branches. Just as parts of several conventional cache lines may make up a single trace line, several trace lines may contain parts of the same conventional cache line. Because of this, the tags must be handled differently in a trace cache. In a conventional cache, low-order address lines are ignored, but for a trace line, the full address must be used in the tag.

A related difference is in handling the index into the cache line. For conventional cache lines, the least significant bits are ignored in selecting a cache line (both index & tag compare), but in the case of a branch into a new cache line, those least significant bits are used to determine an offset from the beginning of the cache line for fetching the first instruction at the branch target. In contrast, the address of the branch target will be the first instruction in a trace line. Thus no offset is needed. Flow-through from the end of the previous cache line via sequential instruction execution simply uses an offset of zero since it will execute the first instruction in the next cache line (independent of whether it is a trace line or not). The full tag compare will select the appropriate line from the congruence class. In the case where the desired branch target address is within a trace line but not the first instruction in the trace line, the trace cache will declare a miss, and potentially construct a new trace line starting at that branch target.

One limitation of trace caches is that branch prediction must be reasonably accurate before constructing traces to be stored in a trace cache. For most code execution, this simply means delaying construction of traces until branch history has been recorded long enough to insure accurate prediction. However, some code paths contain branches that are inherently not predictable. For example, dynamic data may determine whether a specific branch is taken or not. Some implementations add a conventional L1 Instruction cache in addition to an L1 Instruction trace cache in order to better handle code that doesn't execute predictably. This is not a very efficient implementation since the trace cache must be sized to handle all desired trace lines and the conventional cache must be sized to handle all instructions that don't execute predictably. Since the balance between these two resources may be different for different applications, such a design will typically not achieve full utilization of both resources.

SUMMARY OF THE INVENTION

One purpose of this invention is to achieve a flexible balance of resources by handling both predictable and non-predictable code in a single unified instruction cache. Thus, some lines may contain traces and other lines in the same congruence class may contain blocks of instructions consistent with conventional cache lines. One aspect of this invention is the mechanism for indexing into the cache, and selecting the desired line. Another aspect of this invention is control of which lines are contained within the cache. Another aspect is selection between a trace line and a conventional line when both match during the tag compare.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The term "programmed method", as used herein, is defined to mean one or more process steps that are presently performed; or, alternatively, one or more process steps that are enabled to be performed at a future point in time. The term programmed method contemplates three alternative forms. First, a programmed method comprises presently performed process steps. Second, a programmed method comprises a computer-readable medium embodying computer instructions which, when executed by a computer system, perform one or more process steps. Third, a programmed method comprises a computer system that has been programmed by software, hardware, firmware, or any combination thereof to perform one or more process steps. It is to be understood that the term programmed method is not to be construed as simultaneously having more than one alternative form, but rather is to be construed in the truest sense of an alternative form wherein, at any given point in time, only one of the plurality of alternative forms is present.

Figure 1:
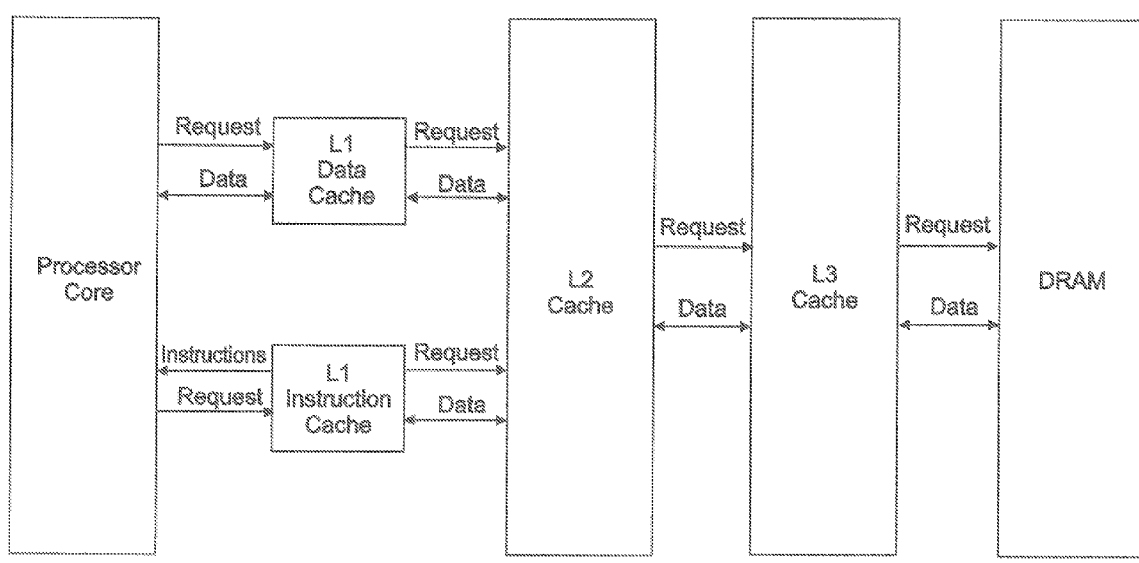
FIG. 1 is a schematic representation of the operative coupling of a computer system central processor and layered memory which has level 1, level 2 and level 3 caches and DRAM.

For a L1 Instruction cache coupled to a computer system processor as shown in FIG. 1 and which has $2^L$ bytes per line, M ways per congruence class, and $2^N$ congruence classes, the instruction address presented to the cache subsystem (FIG. 2) (branch target or flow-through from previous cache line) will be partitioned into the following fields:

Least significant L bits (address byte within line)
Next N bits (index into a specific congruence class)
Most significant bits A typical implementation might have L=6 (16 instructions or 64 bytes per line), M=4 ways per congruence class, and N=7 (128 congruence classes), for a total cache size of 32 KBytes. A typical implementation might also partition each cache line into multiple segments. For instance, a 64 byte line might be made up of data from 4 different arrays (16 bytes or 4 instructions per array). The motivation for this partitioning is that in some cases the required data can be accessed without powering up the entire cache line, thus saving power.

Figure 2:
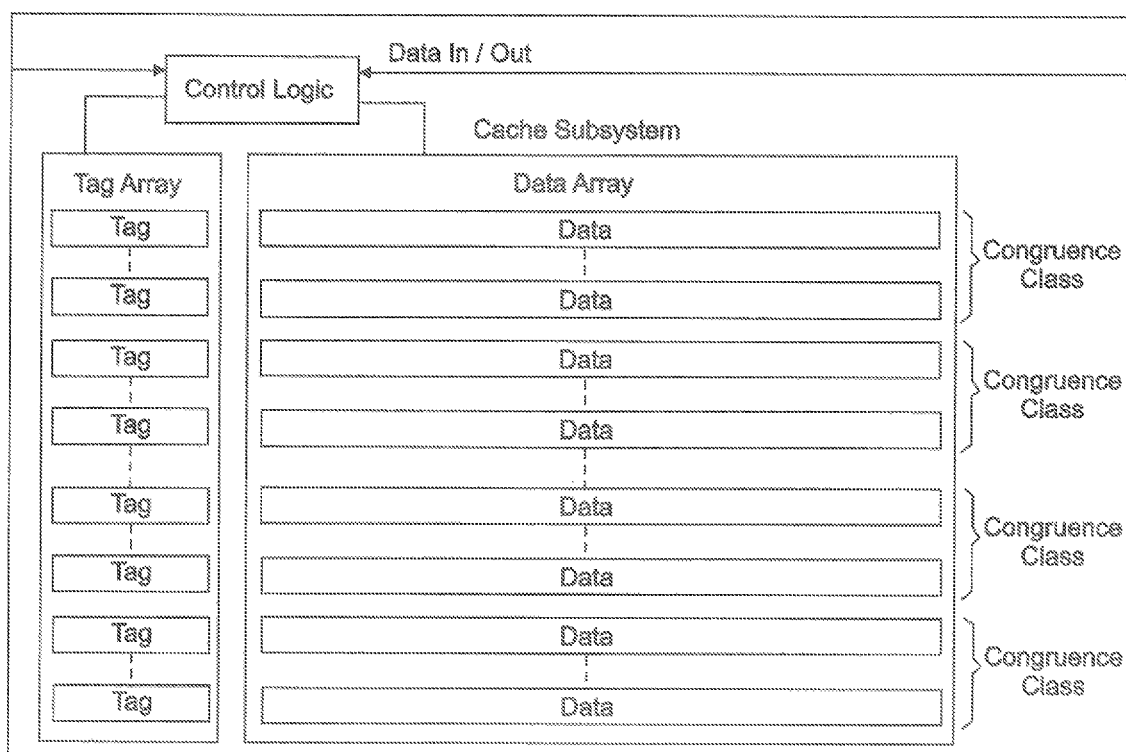
FIG. 2 is a schematic representation of the organization of a L1 cache instruction cache.

It is to be noted that the cache subsystem elements illustrated in FIG. 2 include the tag array, the data array and control logic operatively associated with the two arrays. In accordance with this invention, the control logic circuitry implements the activity of the level one cache as described here. The two arrays are generally similar to prior cache subsystems, and will be understood by persons of skill in the applicable arts. Attention will now be turned to the control logic and the operation of the cache subsystem contemplated by this invention.

Figure 3:
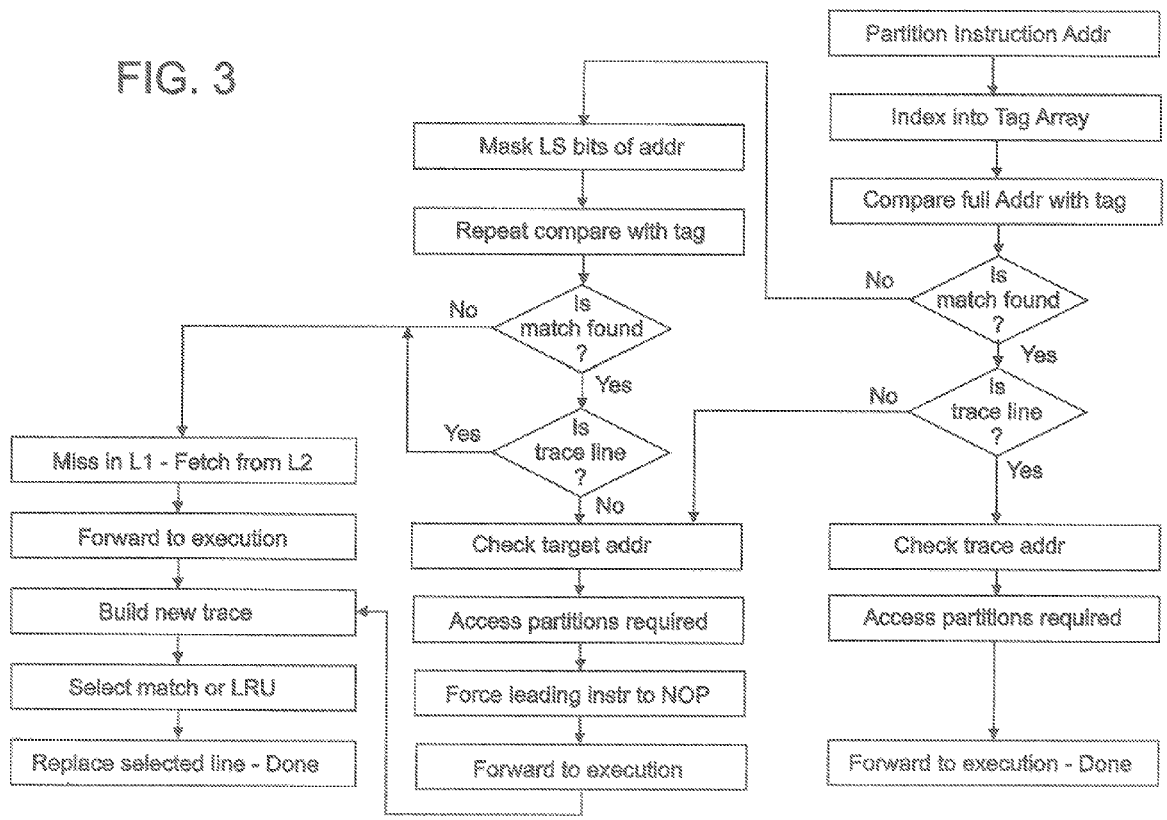
FIG. 3 is a flow chart depicting the processes involved in the operation of a level 1 instruction cache in accordance with this invention.

The process for accessing the cache then includes the following steps as illustrated in the flow chart of FIG. 3:

Take the N bits in the middle partition of the target instruction address for use as an index into the tag array.

For each of the M entries in the tag array from the congruence class selected in step 1, compare the tag field with the full target instruction address.

If match is found, is it a trace line?

If it is a trace line, check the trace length parameter in the tag. Enable only the partitions in the data array required to access the trace contents.

Access cache line from data array and forward trace to execution pipelines and exit process. (Only one cache line is allowed in cache with the same starting address. This may be either a trace line or conventional cache line. In the case of a conventional cache line, it is found during this step only if the target instruction address points to the first instruction of the cache line.)

If no match is found, mask off (to zeros) the L least significant bits of the target instruction address.

Repeat the compare with the tags within the selected congruence class. If a match is found, validate that it is a conventional cache line (i.e. with execution starting somewhere other than the first instruction). Note that if it is a trace line with a starting address with zeros in least-significant bits, it is not the trace line that matches the branch target, and can't be used.

Access cache line from data array. Use least significant L bits from the target instruction address to select only the target partition of the data array. This skips groups of instructions with addresses lower than the branch instruction in increments equal to the data array partition size (e.g. 4 instructions).

Overlay instructions to the left of the branch target instruction (within the same partition as the branch target) with an indication of invalid instruction (force to NOP). Then forward instructions to execution pipelines. If no match is found, declare a miss in the L1 cache, and fetch the target address from the L2 cache.

Then build a new trace line, select a match or least recently used (LRU), and replace the selected line.

In order to insure proper operation, certain rules must be enforced when adding a line (either conventional or trace) to the cache:

If the address of the first instruction in the line to be added matches the tag of a line already in the cache, that matching line must be removed in order to add the new line. This insures that a tag will be unique. If there is no match in tags, then the least recently used line (as indicated by LRU or pseudo-LRU) is replaced by the new line.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
    a computer system central processor and layered memory coupled to and accessible by the central processor, the layered memory including a level one cache;
    control logic circuitry associated with said level one cache which controls the selective storing in interchangeable locations of the level one cache of the layered memory both standard cache lines and trace lines;
    said control logic circuitry partitioning an instruction address presented to the level one cache; indexing the instruction address into a tag array of the level one cache; and comparing the instruction address with the tag array a first time to determine whether a match is found; and
    if a match is found on the first comparison, then
        determining whether the match is a trace line;
        if the match is a trace line, checking the trace address, accessing the required partitions, and forwarding the instruction for execution by the central processor.

2. Programmed method comprising:
    coupling together a computer system central processor and layered memory accessible by the central processor, the layered memory including a level one cache;
    selectively storing in interchangeable locations of the level one cache of the layered memory both standard cache lines and trace lines;
    partitioning an instruction address presented to the level one cache;

indexing the instruction address into a tag array of the level one cache;
comparing the instruction address with the tag array a first time to determine whether a match is found;
if a match is found on the first comparison, then
determining whether the match is a trace line;
if the match is a trace line, checking the trace address, accessing the required partitions, and forwarding the instruction for execution by the central processor.

3. Programmed method according to claim 2 wherein:
if no trace line is found on the first comparison, then
checking the target address, accessing the required partitions, forcing the leading instruction to NOP (No Operation), and forwarding the instruction to execution by the central processor, then
building a new trace line, selecting a cache line to be replaced and replacing the selected cache line with the new trace line.

4. Programmed method according to claim 2 wherein:
if no match is found on the first comparison, then
masking the least significant bits of the instruction address; and
comparing the masked instruction address with the tag array a second time to determine whether a match is found;
if a match is found on the second comparison; then
if the match is trace line, declaring a miss in the level one cache and fetching instructions from a further level cache, forwarding the instruction for execution by the central processor, building a new trace line, selecting a cache line to be replaced and replacing the selected cache line.

5. Programmed method according to claim 4 wherein:
if the match found on the second comparison is not a trace line, checking the trace address, accessing the required partitions, forcing the leading instruction to NOP (No Operation), and forwarding the instruction for execution by the central processor; then
building a new trace line, selecting a cache line to be replaced and replacing the selected cache line with the new trace line.

6. Programmed method comprising:
coupling together a computer system central processor and layered memory accessible by the central processor, the layered memory including a cache;
selectively storing in interchangeable locations of the cache of the layered memory both standard cache lines and trace lines;
partitioning an instruction address presented to the cache;
indexing the instruction address into a tag array of the cache;
comparing the instruction address with the tag array a first time to determine whether a match is found;
if a match is found on the first comparison, then
determining whether the match is a trace line;
if the match is a trace line, checking the trace address, accessing the required partitions, and forwarding the instruction for execution by the central processor;
if no trace line is found on the first comparison, then
checking the target address, accessing the required partitions, forcing the leading instruction to NOP (No Operation), and forwarding the instruction to execution by the central processor, then
building a new trace line, selecting a cache line to be replaced and replacing the selected cache line with the new trace line;
if no match is found on the first comparison, then
masking the least significant bits of the instruction address; and
comparing the masked instruction address with the tag array a second time to determine whether a match is found;
if a match is found on the second comparison; then
if the match found on the second comparison is a trace line, declaring a miss in the cache and fetching instructions from a further level memory, forwarding the instruction for execution by the central processor, building a new trace line, selecting a cache line to be replaced and replacing the selected cache line;
if the match found on the second comparison is not a trace line, checking the trace address, accessing the required partitions, forcing the leading instruction to NOP (No Operation) and forwarding the instruction for execution by the central processor; then
building a new trace line, selecting a cache line to be replaced and replacing the selected cache line with the new trace line.

* * * * *

UNITED STATES PATENT AND TRADEMARK OFFICE
CERTIFICATE OF CORRECTION

PATENT NO. : 7,644,233 B2
APPLICATION NO. : 11/538445
DATED : January 5, 2010
INVENTOR(S) : Davis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this

Sixteenth Day of November, 2010

David J. Kappos
*Director of the United States Patent and Trademark Office*